United States Patent [19]

Warren

[11] 4,095,428

[45] Jun. 20, 1978

[54] SOLAR ELECTRIC POWER PLANT AND AN IMPROVED THERMAL COLLECTOR OF SOLAR ENERGY

[75] Inventor: Roger W. Warren, Pittsburgh, Pa.

[73] Assignee: Westinghouse Electric Corp., Pittsburgh, Pa.

[21] Appl. No.: 552,834

[22] Filed: Feb. 25, 1975

[51] Int. Cl.$^2$ ............................. F03G 7/02; F24J 3/02
[52] U.S. Cl. ...................................... 60/641; 126/270; 126/271
[58] Field of Search ................... 60/641; 126/270, 271

[56] References Cited

U.S. PATENT DOCUMENTS

| 201,439 | 3/1878 | Moreau | 126/270 |
|---|---|---|---|
| 1,240,890 | 9/1917 | Shuman | 126/271 |
| 1,888,620 | 11/1932 | Clark | 126/271 |
| 2,998,006 | 8/1961 | Johnston | 126/271 |
| 3,000,375 | 9/1961 | Golay | 126/270 |
| 3,178,113 | 4/1965 | Curry et al. | 126/270 |
| 3,387,602 | 6/1968 | Thomason | 126/271 |
| 3,875,925 | 4/1975 | Johnston | 126/270 |

Primary Examiner—Allen M. Ostrager
Attorney, Agent, or Firm—E. F. Possessky

[57] ABSTRACT

A thermal collector of solar energy includes an elemental semiconductor material to absorb a substantial portion of the energy of solar radiation that is incident upon the material. At longer wavelengths, such material reradiates absorbed energy at a substantially reduced rate, whereby the efficiency of energy collection at high temperatures is improved. In a solar electric power plant collected heat is transferred from such collectors to a motive fluid, which drives a turbine-generator. The high operating temperature of the energy-absorbing material permits efficient conversion of the collected energy to electrical energy, while a required number of solar collectors is correspondingly reduced by the improved collection efficiency.

27 Claims, 8 Drawing Figures

SOLAR ELECTRIC POWER PLANT AND AN IMPROVED THERMAL COLLECTOR OF SOLAR ENERGY

BACKGROUND OF THE INVENTION

A thermal collector of solar energy collects energy of solar radiation that is incident upon the collector. Collected energy is transferred as heat to a heat using apparatus such as power generation equipment, a home heating or air conditioning system, a heat pump, or the like.

Electric power plants typically include heat generating equipment, equipment to transfer generated heat to a motive fluid and a turbine-generator driven by the motive fluid. In conventional power plants heat is generated by a nuclear reactor, or by combustion of a fossil fuel such as coal, oil, or natural gas. In one type of solar electric power plant solar energy is collected as heat which is transferred to the motive fluid. Such a solar electric power plant is an attractive alternative to those power plants that depend upon combustion of fossil fuels, especially in view of the generally rising costs of fossil fuels.

Typically a large number of thermal collectors, covering a substantial area upon which solar radiation is incident, is required to collect sufficient heat for generation of electric power in a solar power plant as above described. A thermal collector for use in such a solar power plant desirably operates at high temperatures which permit efficient conversion of the collected energy to electrical energy. Such a collector further desirably collects solar energy at an elevated efficiency at such operating temperatures, for then the required number of thermal collectors is reduced.

A thermal collector of solar energy typically includes an absorber to absorb energy of solar radiation and transfer such energy as heat to a heat transfer medium. In a class of proposed absorbers, an absorber comprises multiple layers of materials, each layer having certain optical properties such that the combined optical effect of the layers is that of an absorber. Usually the thickness of each layer must be carefully controlled, and the layers must be deposited on a carefully prepared substrate. In some multilayer absorbers, destructive reactions may occur between the materials of the various layers, or temperature changes may vary the optical properties of a layer, thereby reducing the overall effectiveness of the absorber. Other multilayer absorbers are effective within a limited band of wavelengths of the solar radiation. Some multilayer absorbers are most effective when the angle of incidence of the solar radiation is within a limited range.

There appears to be a need for a thermal collector of solar energy that is capable of efficient collection at operating temperatures that are suitable for efficient conversion of collected energy to ellectricity, especially when heat exchange and rotational apparatus participate in such conversion. Such a collector advantageously is effective at widely varying wavelengths and incidence angles of solar radiation, and retains its desirable properties at elevated temperatures.

The description of prior art herein is made on good faith and no representation is made that any prior art considered is the best pertaining prior art, nor that the interpretation placed on it is unrebuttable.

SUMMARY OF THE INVENTION

In one aspect the present invention relates to a thermal collector of solar energy that is adapted to deliver collected energy to a heat using apparatus. Solar radiation is transmitted to a finely divided semiconductor material which absorbs energy of the transmitted radiation. The absorbed energy heats the semiconductor material. Heat is transferred from the heated semiconductor material to the heat using apparatus.

In another aspect the present invention relates to a solar electric power plant which includes a turbine driven by a motive fluid, and an electric generator driven by the turbine. A window transmits solar radiation to a body of finely divided elemental semiconductor material which is heated by the energy of solar radiation that it absorbs. Heat is transferred from the body of semiconductor material to the motive fluid, whereby collected solar energy is converted to electricity.

DESCRIPTION OF THE PREFERRED EMBODIMENT

Figure 1:
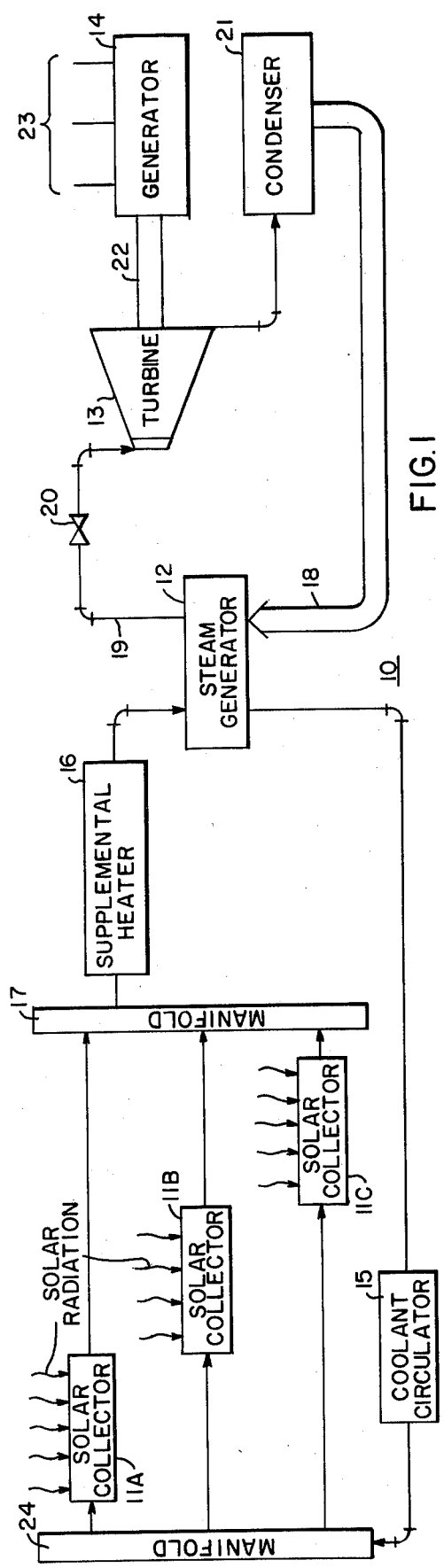
FIG. 1 schematically shows a solar electric power plant according to one embodiment of the present invention.

Referring to FIG. 1 a solar electric power plant 10 includes solar energy collectors 11a, 11b and 11c to collect heat energy of solar radiation that is incident upon the collectors. Collected heat is transferred to a steam generator 12, wherein the collected heat provides for the generation of steam that is supplied to a steam turbine 13. The steam turbine 13 converts energy of the supplied steam to mechanical rotational energy, which rotates an electric generator 14 to generate electricity.

A circulator 15 is connected to circulate a coolant fluid through each of the solar collectors 11a, 11b and 11c and through the steam generator 12. The coolant fluid acquires heat from the solar collectors and transfers the acquired heat to the steam generator 12. The solar collectors 11a, 11b and 11c are cooled most effectively by a gas, in this case air, although other solar collectors in accordance with the present invention are cooled by a gaseous or a liquid coolant, as hereinafter described.

Coolant gas that has been heated by the solar collectors 11a, 11b and 11c is discharged from the collectors and flows through a supplemental heater 16 to an inlet of the steam generator 12. On cloudy days, or at night, the supplemental heater 16 adds heat to the coolant gas as such gas flows through the heater, in order to make up a deficiency between the total heat colleced by the solar collectors and the heat input requirement of the steam generator 12. The supplemental heater 16 typically includes conventional burners to burn natural gas or a liquid fuel and heater transfer apparatus to transfer heat energy released by such combustion to the coolant gas as the gas flows through the heater. Because both the energy level of solar radiation and the power demand upon the generator 14 vary during the course of operation of the power plant 10, the amount of supplemental heat required of the heater 16 varies, and provision therefore is made to vary the flow of fuel to the burners of the heater 16.

In more detail, heated gas is discharged from an outlet solar collection and flows to a manifold 17 that is connected to deliver heated gas to the supplemental heater 16, which is connected to discharge heated gas to an inlet of the steam generator 12. The steam generator 12 transfers heat from the heated gas flow of feedwater that is introduced to the steam generator through a line 18. The heated feedwater is discharged as steam from the steam generator 12 through a main steam line 19, which carries the generated steam through a control valve 20 to the steam turbine 13. The control valve 20 governs the flow of steam through the turbine 13 for purposes of controlling the shaft speed or the load on the turbine-generator. Exhaust steam from the turbine 13 passes to a condenser 21, from which feedwater is discharged through a feedwater line 18, the feedwater thereafter passing through a connection of feedwater pumps and heaters (not shown) to return to the steam generator 12.

A shaft 22 couples the turbine 13 to the electric generator 14. The steam turbine 13 thus uses steam that is generated by the steam generator 12 to drive the electric generator 14 to generate electric power that flows from the generator 14 through output lines 23 to a power network (not shown).

Coolant gas passes from the steam generator 12 through the coolant circulator 15 to a manifold 24, which distributes coolant gas to an inlet to each of the solar collectors 11a, 11b and 11c. Thus coolant gas flows from the manifold 24 through the solar collectors and through the supplemental heater 16. Heat that is acquired by the coolant gas from the solar collectors and from the supplemental heater 16 is carried by the heated coolant gas to the steam generator 12, where such heat provides for steam generation. From the steam generator 12 coolant gas is recirculated to the manifold 24, whereupon the coolant gas is reheated and returned to the steam generator. The coolant circulator 15 maintains a flow of coolant gas through the loop which includes the solar collectors, the supplemental heater 16, the steam generator 12, and the coolant circulator.

As described below it is desirable to vary the flow of coolant gas during the course of operation of the power plant 10. Thus the coolant circulator 15 includes a conventional gas blower that is rotated at a variable speed, whereby the flow of coolant gas is varied. The gas blower may be driven by an electric motor of variable speed, or by a small steam turbine connected in the steam side of the power plant 10. If a small steam turbine is utilized, the flow of steam through such small turbine is controlled in order to govern the speed of the gas blower and consequently the flow of coolant gas.

During startup of the electric power plant 10, the circulator 15 maintains a low flow of coolant gas through the solar collectors 11a, 11b and 11c and through the steam generator 12 for purposes of warming the initially cold steam generator. The supplemental heater 16 normally is not used to heat the coolant gas at such time, but the heater is used to assist in warming the steam generator 12 at night or on a cloudy day. During warm-up of the steam generator 12, the flow rate of the coolant gas is maintained at a value such that the steam generator is warmed gradually at a rate that does not subject parts of the steam generator to undesirable thermal stress.

When the steam generator 12 is warmed sufficiently to permit evaporation of feedwater to steam, the control valve 20 is opened slightly to permit a small flow of steam through the turbine 20 for purposes of warming the turbine, which is rotated solely on turning gear at such time. The small steam flow is condensed by the condenser 21, and the feedwater system (not shown) is operated to maintain a flow of feedwater through the line 18 such that the steam generator 12 is adequately supplied with feedwater during warm-up. While the turbine 13 is warmed on turning gear, warm-up of the steam generator 12 is continued.

When the steam generator 12 is warmed sufficiently to produce steam of adequate temperature and pressure for purposes of accelerating the turbine-generator, the steam turbine 13 is taken off turning gear and the control valve 20 is used to govern the flow of steam through the turbine so that the shaft speed of the turbine-generator increases at a desired rate, while various parts of the turbine 13 are not subjected to undesirable thermal stress. The shaft speed of the turbine-generator is increased until such speed is equal to the synchronous speed, at which time the generator 14 is synchronized with the power network (not shown), and the output lines 23 are connected with the power network by closure of main circuit breakers (not shown). After the generator 14 is synchronized and connected with the power system, loading of the turbine-generator is commenced.

During load operation of the power plant 10, the control valve 20 is positioned to cause a flow of steam through the turbine 13 such that the power output of the generator 14 is equal to a desired power output (load). The feedwater system (not shown) is operated so that the flow of feedwater through the line 18 maintains a desired inventory of liquid and steam within the steam generator 12.

During load operation of the power plant 10 the fuel flow to the burners of the supplemental heater 16 is governed in relation to the temperature of steam in the main steam line 19. As the main steam temperture decreases from a desired value the fuel flow to the burners of the heater 16 is increased, to increase the main steam temperature toward its desired value. When the main steam temperature increases from a desired value the fuel flow to the burners of the heater 16 is reduced, to decrease the main steam temperature toward its desired value. Generally, the fuel flow rate to supplemental heater 16 is greater on a cloudy day or at night, when the energy level of solar radiation is lower, than the fuel flow rate on a bright sunny day, when the energy level of solar radition is relatively high. When the energy level of solar radiation is relatively high, the heat energy collected by the solar collectors may be sufficient to satisfy the heat input requirement of the steam generator 12, in which case no additional heat is required of the supplemental heater 16, and the fuel flow to the burners of such heater is shut off. During load operation the flow rate of coolant gas through the loop comprising the solar collectors, the supplemental heater 16, the steam generator 12, and the coolant circulator 15, is increased with increasing load level and decreased with decreasing load level. Such variation of the coolant gas flow rate is accomplished by varying the speed of the gas blower that is included in the circulator 15.

The energy of solar radiation is highly concentrated relative to the area on which such radiation is incident, and the light concentration of the energy necessitates that the solar collectors shown in FIG. 1 cover a large area on which solar radiation is incident. Therefore a large number of solar collectors is required to collect sufficient energy for purposes of power generation, the number of collectors shown in FIG. 1 being limited for clarity of illustration. Solar collectors in addition to those shown in FIG. 1 are connected to receive cold air from the manifold 24 and to discharge heated air to the manifold 17. A large installation may require a multiple number of manifolds connected as the manifold 24 and a multiple number of manifolds connected as the manifold 17.

By raising the temperature of the steam that is discharged from the steam generator 12 through the main steam line 19, the efficiency of the turbine-generator shown in FIG. 1 normally is improved. Such improved efficiency desirably reduces the heat input requirement of the steam generator 12 in order to generate a given output. A high temperature of the steam in the main steam line 19 requires a correspondingly high temperature of the heated coolant gas at the inlet of the steam generator 12. When the average temperature of heated coolant gas at the outlets of the collectors is lower than the required temperature of the gas at the inlet of the steam generator 12, the heater 16 adds heat to the gas to raise its temperature to its required level. At such times it is advantageous that the level of the average temperature of the coolant gas at the outlets of the collectors be close to the required temperature level at the inlet of the steam generator 12, because the fuel required by the heater 16 is reduced when the difference between such coolant gas temperatures is reduced. When the average temperature of the coolant gas at the collector outlets is quite close to the required level at the inlet of the steam generator 12, the heater 16 requires substantially no fuel. In either event, it is advantageous that a solar collector collect energy at an elevated efficiency while discharging heated coolant gas at a high temperature, for then a relatively smaller number of collectors is needed.

Figure 2:
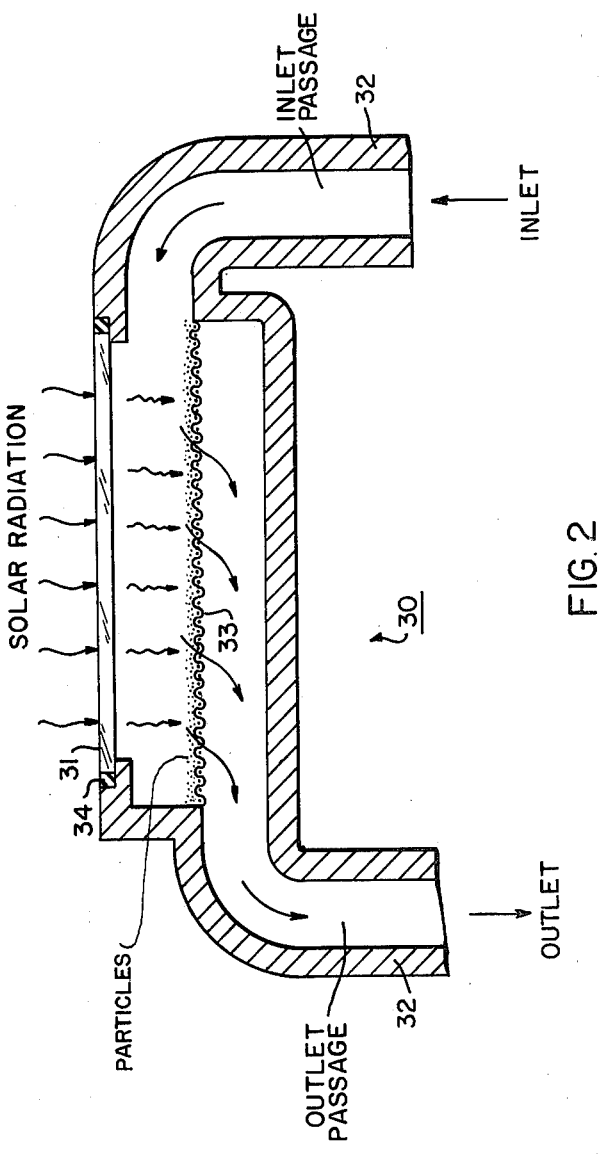
FIG. 2 shows a gas-cooled thermal collector of solar energy according to the principles of the present invention and employable in the power plant shown in FIG. 1.

Referring now to FIG. 2 there is shown a sectional view of a thermal collector of solar energy 30 that collects such energy at a high efficiency. A translucent window 31, in this case glass, is carried by an insulated support 32, which disposes the window 31 to transmit solar radiation to an energy-absorbing material, in this case substantially pure, annealed silicon powder, which is carried by a mesh 33. The powdered silicon is exposed to the solar radiation that is transmitted by the window 31, and absorbs a significant portion of the energy of the transmitted radiation as heat. The silicon particles are heated by the absorbed energy. A flow of coolant gas passes through the silicon powder bed in heat transfer relation with the heated particles. After passage through the solar collector 30, the heated coolant gas flows through the supplemental heater 16 (see FIG. 1) to the steam generator 12, when the solar collector 30 is utilized in the power plant 10 (see FIG. 1).

In more detail, the window 31 is supported by a lip formed in the support 32 as shown. A compliant gasket 34, in this case rubber, is disposed between the edges of the window 31 and the support 32. The window 31 and the gasket 34 together prevent moisture and other contaminants from entering the solar collector 30, which contaminants would reduce the effectiveness of the collector if permitted to enter the space within the collector. Because of a difference between the temperature coefficients of expansion of the window 31 and the support 32, the window 31 moves laterally toward or away from the support 32 when the temperatures of the window and the support vary. The compliant gasket 34 permits such lateral motion of the window 31 relative to the support 32 while maintaining a seal to prevent moisture and other contaminants from entering the collector.

Coolant gas enters the collector 30 at an inlet, as shown, and passes through an inlet passage to the space beneath the window 31. The coolant gas then flows downwardly through the mesh 33, as shown. As it passes through the mesh 33, the coolant gas is intimate heat transfer relation with the silicon particles that are carried by the mesh 33, whereby the coolant gas is heated. After passage through the mesh 33 the coolant gas flows through an outlet passage to an outlet, as shown. The solar collector 30 is connected in the power plant 10 (see FIG. 1) by connecting the inlet to the manifold 24 and the outlet to the manifold 17.

The average particle size of the powdered silicon is approximately one to sixty microns as later discussed. The silicon particles are carried by the upper surfaces of the mesh 33 in a loose powder layer that is typically .01 to 0.1 centimeter thick. The dimension of a side of a generally square aperture of the mesh 33 is less than the average size of the silicon particles, thereby preventing the particles from falling through the mesh. Thus the loose particles and the mesh together comprise a powder bed that is pervious to the coolant gas and which exposes the particles to solar radiation that is transmitted by the window 31. When coolant gas passes through the powder bed at a velocity of approximately 5 centimeters per second, there is a pressure drop across the powder bed from top to bottom, which is typically 0.2 centimeters $H_2O$. The pressure differential, in addition to the weight of the particles, holds the loose powder in place on the upper surfaces of the mesh 33.

A high temperature of the coolant gas as such gas is delivered to the steam generator 12 of the power plant 10 (see FIG. 1) is necessary for efficient operation of the steam generator 12 and the turbine-generator. It is desirable to reduce the amount of heat that must be supplied to the coolant gas by the heater 16, for purposes of reducing the fuel required by the heater. For efficient operation of the steam generator 12 and the turbine-generator, and for reduced fuel consumption of the heater 16, the energy-absorbing material therefore must operate at a temperature closely approaching the desirably high temperature of the coolant gas at the inlet of the steam generator 12. For efficient energy collection at such high temperatures it is important that the energy-absorbing material have a low emissivity (absorptivity) in the infrared regions, which typically include wavelengths greater than 1.4 micron. If such is not the case, the relatively high infrared emissivity of the energy-absorbing material causes a large portion of the absorbed energy to be reradiated in the infrared at the desired high operating temperature of the energy-absorbing material, and the efficiency of energy collection is correspondingly greatly reduced. Such reduced efficiency undesirably increases the number of solar collectors that is needed in the power plant 10.

Most of the energy of solar radiation is carried by radiation of wavelengths less than approximately 1.4 micron. At wavelengths above 1.4 micron the energy of solar radiation is lightly concentrated relative to the concentration of such energy over the wavelength range 0 to 1.4 micron. Thus an ideal energy absorbing material for use in the solar collectors of the power plant 10 (see FIG. 1) absorbs all of the energy of solar radiation of wavelength less than 1.4 micron (an absorptivity of 1.0 below 1.4 micron) and absorbs none of the energy of radiation of wavelength greater than 1.4 micron (an absorptivity of 0 above 1.4 micron), whereby the ideal absorber reradiates none of the absorbed energy in the infrared at the high operating temperatures required for efficient operation of the power plant 10. By absorbing all of the energy of solar radiation at wavelengths where such energy is heavily concentrated while reradiating none of the absorbed energy in the infrared at high temperatures, an ideal energy-absorbing material collects solar energy at high efficiency while operating at high temperatures.

Figure 3:
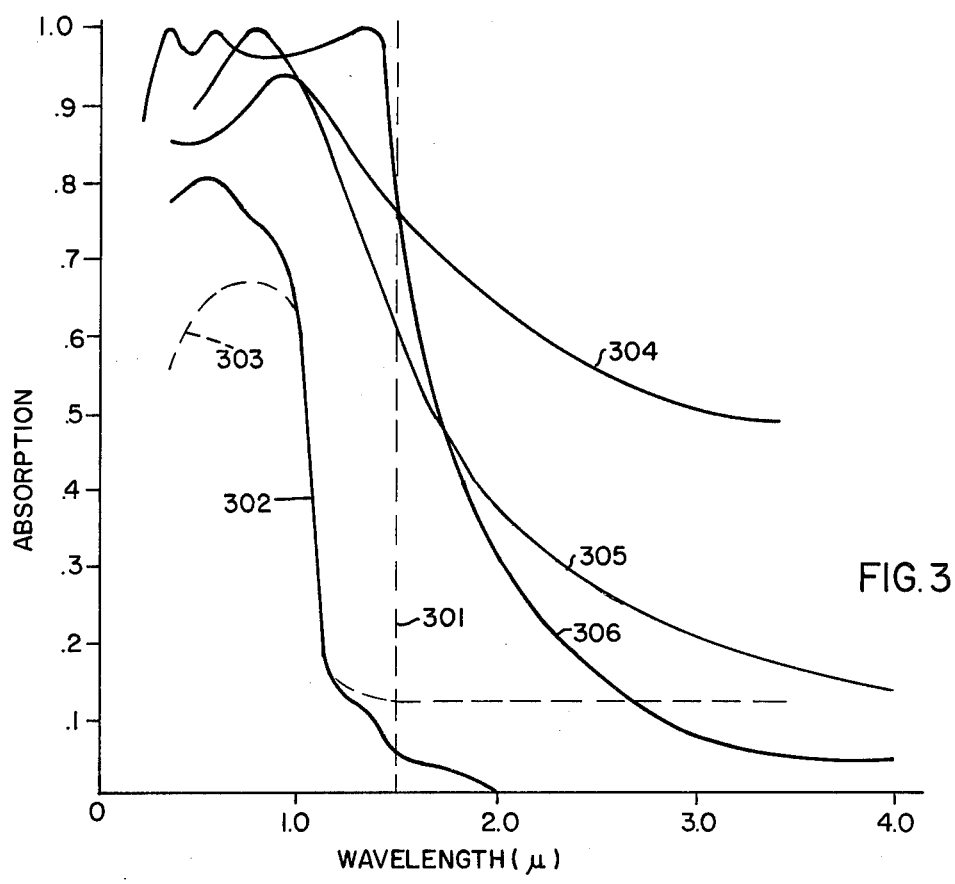
FIG. 3 graphically illustrates the fractional absorbtion characteristic of powdered silicon in relation to the fractional absorption characteristics of other materials for absorbing solar energy.

Referring now to FIG. 3 the fractional absorption characteristic of substantially pure annealed silicon powder of 60 micron average particles size is graphically compared with the fractional absorption of an ideal energy-absorbing material and with the fractional absorption properties of a number of conventional energy-absorbing materials. The vertical scale shows the fractional absorption, that is, the fractional portion of energy of radiation of a given wavelength that is absorbed by the energy-absorbing material, while the horizontal scale shows the corresponding wavelength of such radiation. A curve 301 shows the fractional absorption of an ideal energy-absorbing material, as previously described. Between 0 and 1.4 micron, the fractional absorption is 1.0, and the ideal energy absorber absorbs all of the energy of incident radiation of such wavelengths. At 1.4 micron the fractional absorption of the ideal energy absorber decreases to 0 and remains at 0 for all wavelengths in excess of 1.4 micron. Thus, the ideal energy absorber absorbs all of the energy of solar radiation at wavelengths where such energy is heavily concentrated, and absorbs none of the energy of wavelengths where such energy is relatively lightly concentrated, whereby none of the absorbed energy is reradiated in the infrared at high temperatures.

A curve 302 shows the fractional absorption of substantially pure annealed silicon powder of 60 micron average particle size. A curve 303 shows the fractional absorption of an evaporated silicon coating on a polished aluminum substrate; a curve 304 fractional absorption of a black copper oxide layer formed on steel by dipping; a curve 305 the fractional absorption of a thin nickel coating on copper; and a curve 306 the fractional absorption of a multi-layer evaporated coating. Generally, the fractional absorption of all of the energy absorbers shown in FIG. 3 is substantially between 0 and 1.4 micron, where the energy of solar radiation is relatively heavily concentrated. Over such wavelength range, some of the fractional absorption characteristics more closely approach the ideal characteristic than does the fractional absorption of the silicon powder. At wavelengths above 1.4 micron however, the fractional absorption of the silicon powder approaches much more closely the characteristic of the ideal absorber than do the other characteristics that are shown in FIG. 3. It is the greatly reduced fractional absorption of the silicon powder at wavelengths above 1.4 micron that permits the powder to absorb solar energy at high efficiency at high operating temperatures, because of the greatly reduced tendency of the silicon to reradiate absorbed energy in the infrared at high temperatures which reradiation reduces the efficiency of the energy collection.

Because of the greatly reduced fractional absorption of the powdered silicon at longer wavelengths, the solar energy collector shown in FIG. 2 and connected in the power plant 10 shown in FIG. 1 operates at high temperatures which are desirable for operation of the power plant 10 at an improved efficiency, and collects solar energy at high efficiency while operating at such high temperatures. As previously described such high efficiency reduces the number of solar collectors that are required in the power plant 10.

Figure 4:
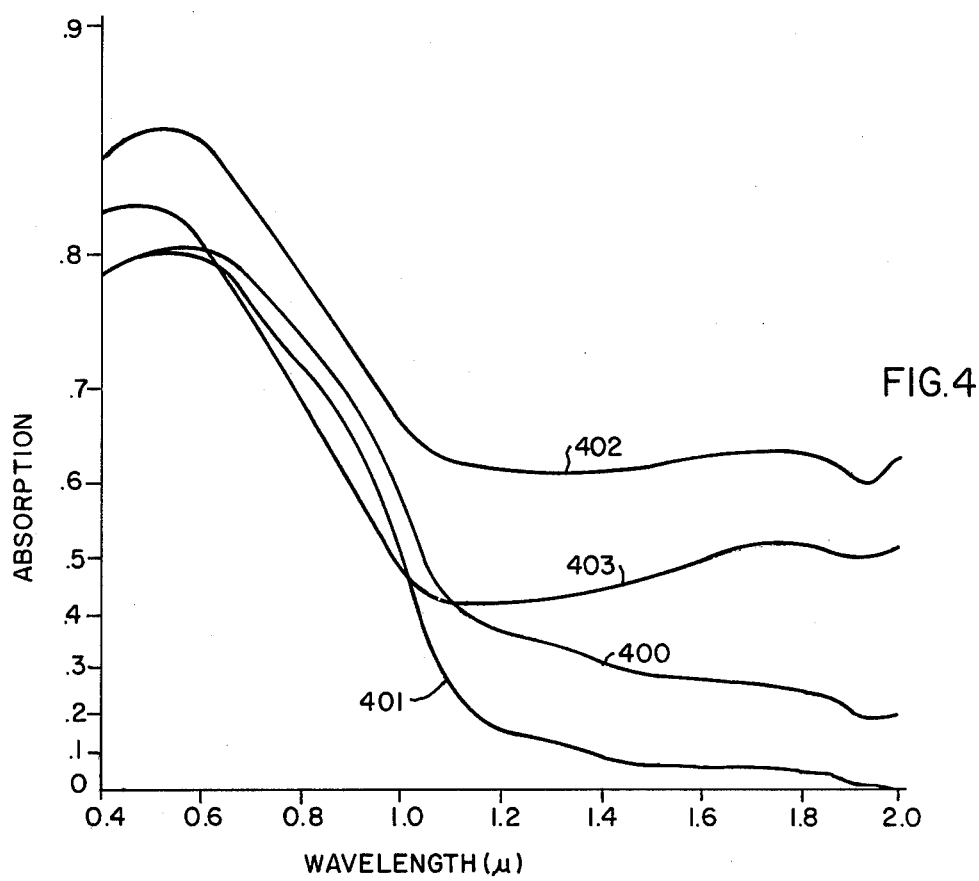
FIG. 4 graphically illustrates the fractional absorption characteristic of silicon powders of varying purity and preparation.

With reference to FIG. 4, the fractional absorption of powdered silicon is illustrated graphically (vertical axis) with respect to the wavelength of incident radiation. A curve 400 shows the fractional absorption of a substantially pure (at least 1.0 ohm-cm. resistivity) silicon powder, the fractional absorption decreasing from approximately 0.8 at shorter wavelengths to approximately 0.2. A curve 401 shows the fractional absorption of a substantially pure (at least 1.0 ohm-cm resistivity) silicon powder which is annealed in a nitrogen atmosphere for one hour at a temperature of approximately 400° C. It is evident that annealing the silicon after powdering desirably reduces the fractional absorption at longer wavelengths, since the curve 400 relates to a powder that is not annealed. When the silicon powder is utilized as the absorber in a thermal collector of solar radiation, such reduction of the fractional absorption at longer wavelengths correspondingly reduces reradiation of absorbed energy at those wavelengths, thus permitting the absorber to achieve a high efficiency of energy collection at a high operating temperature. As heretofore explained such high operating temperatures typically increase the efficiency at which the collected energy can be utilized, especially in the conversion of such energy to electric energy with heat exchange and rotating apparatus, while a high efficiency of collection reduces the number of collectors that is required.

FIG. 4 also illustrates the fractional absorption of a relatively impure silicon powder that is not annealed (curve 402) and the fractional absorption (curve 403) of an annealed silicon powder of the same degree of impurity as that of curve 402. As shown by the curve 402, unannealed relatively impure powdered silicon has a fractional absorption of approximately 0.6 at longer wavelengths. The fractional absorption at longer wavelengths of the relatively impure silicon powder is reduced somewhat by annealing, as the curve 403 shows.

For purposes of efficiently absorbing energy of solar radiation with desirably reduced reradiation of absorbed energy at high temperatures, the substantially pure, annealed silicon powder has the most desirable fractional absorption properties of those shown in FIG. 4.

Figure 5:
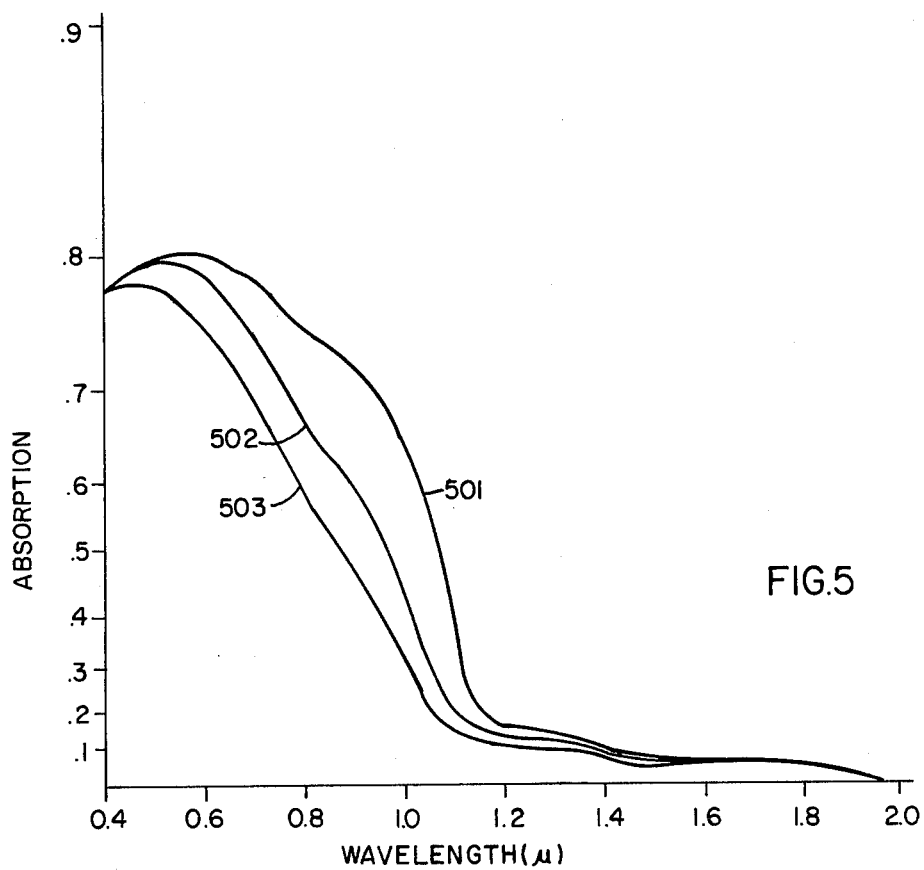
FIG. 5 graphically illustrates the fractional absorption characteristics of silicon powder of varying average particle size.

With reference to FIG. 5 there is graphically illustrated the fractional absorption of a high purity annealed silicon powder on the vertical axis with respect to the corresponding wavelength of the incident energy (horizontal axis) for various average particle sizes. A curve 501 shows the fractional absorption for such powder of 60 micron average particle size; a curve 502 shows the fractional absorption for such powder of 5 micron average particle size; and a curve 503 relates to such powder of 1 micron average particle size. Generally, each curve shows a maximum fractional absorption of approximately 0.75 at shorter wavelengths. With increasing wavelength, the fractional absorption of each particle size decreases to less than 0.10. It is seen that the transition from higher to lower fractional absorption occurs at lower wavelengths for smaller average particle size. Each of the fractional absorption curves of FIG. 5 shows desirable properties of an absorber of solar radiation, in that the fractional absorption is relatively high at shorter wavelenghts, where the major portion of the energy of solar radiation is concentrated, and relatively low at longer wavelengths, for desirably reduced reradiation of absorbed energy.

When a material having desirable fractional absorption properties is employed as an absorber of the energy of solar radiation in a thermal collector that is arranged to operate at elevated temperatures, it is important that the material retain those desirable properties at the elevated operating temperatures. Calculations and optical measurements related to silicon powder show that the fractional absorption properties of such powder are retained up to at least 300° C. The measured fractional absorption of silicon powder at elevated temperatures shows that its desirable absorption properties are retained up to wavelengths of 2.0 microns. Calculations show the desirable properties are retained further into the infrared.

Generally a powdered elemental semiconductor material has a fractional absorption characteristic that is desirable for absorption of solar energy with high efficiency at high temperatures of the material. In addition to silicon, powdered germanium is another elemental semiconductor material that has a relatively low fractional absorption at longer wavelengths and a substantially higher fractional absorption at shorter wavelengths, with the transition from relatively high to relatively low fractional absorption occuring at somewhat longer wavelengths for germanium than for silicon (see FIG. 3). A powdered elemental semiconductor has such a desirable fractional absorption characteristic because each particle is a strong absorber of solar energy at shorter wavelengths, where such energy is heavily concentrated. In its finely divided state a powdered elemental semiconductor material presents many strongly absorbing surfaces to incident radiation, and thus such a material substantially absorbs energy of radiation of widely varying angle of incidence. At longer wavelengths, each particle scatters incident radiation, with the result that radiation is largely reflected by the powder, due to a succession of scattering. Such scatterings contribute to the greatly reduced fractional absorption of such a powder at longer wavelengths.

Powdered molecular semiconductor materials such as copper oxide and copper sulfide, and powdered insulator materials such as manganous oxide and ferrous oxide, are effective absorbers of the energy of solar radiation at shorter wavelengths. However, such molecular semiconductor and insulator materials tend to reradiate absorbed energy at longer wavelengths, due to certain molecular vibrations. Elemental semiconductor materials are not subject to such vibrations, which contributes to their desirably diminished tendency to reradiate absorbed energy at high material temperatures.

A powdered elemental semiconductor material is better adapted for utilization as the energy-absorbing material in the solar collector shown in FIG. 2 and connected in the power plant 10 (see FIG. 1) than, for example, a powdered molecular semiconductor material or a powdered insulator material, because of the reduced tendency of the powdered elemental semiconductor material to reradiate absorbed energy at high temperatures. Thus a powdered elemental semiconductor material permits the solar collector shown in FIG. 2 to collect energy at high efficiency at the high material temperatures which are essential for efficient conversion of the collected energy to electrical energy, especially when heat exchange and rotational apparatus participate in such conversion. As previously described, the efficiency of a powdered elemental semiconductor material as an absorber of solar energy is improved by annealing the material after powdering, and by substantial purity of the material. Generally, a material is adapted for utilization as the energy absorber in the solar collector shown in FIG. 2 for efficient energy collection at high material temperatures, provided that the material has a relatively high fractional absorption at shorter wavelengths, where solar energy is heavily concentrated, and a low fractional absorption at longer wavelengths, where solar energy is lightly concentrated. It is understood that such a material must retain its desirable fractional absorption characteristics at high temperatures which permit efficient conversion of collected energy to electrical energy, and that the material must be pervious to a flow of coolant gas through the collector (see FIG. 2).

Figure 6:
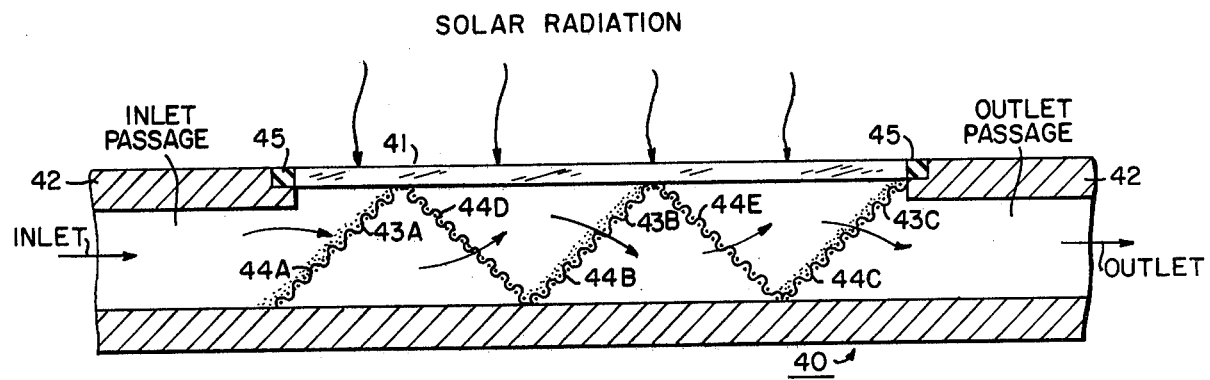
FIG. 6 shows another gas-cooled thermal collector of solar energy according to the principles of the present invention and employable in the power plant shown in FIG. 1.

Referring now to FIG. 6 there is shown a sectional view of another thermal collector of solar radiation 40 that is adapted to collect solar energy efficiently at high operating temperatures. A translucent window 41, in this case glass, is carried by an insulated support structure 42 so that solar radiation is incident upon the window as shown. A flow of coolant gas enters the solar collector 40 at an inlet and flows through an inlet passage. In the space beneath the window 41, meshes 43A, 43B and 43C are carried by the insulated support structure 42, so that the flow of coolant gas passes through a multiple number of meshes as it moves in the general direction of an outlet passage and an outlet. Each of the meshes 43A, 43B and 43C carries an energy-absorbing material, in this case substantially pure, annealed silicon powder, so that the powders are exposed to solar radiation that is transmitted through the window 41 as shown. Each powder absorbs a substantial portion of the energy of such transmitted radiation and is heated by the absorbed energy. Each mesh and its powder comprise a powder bed that is pervious to the flow of coolant gas. As the coolant gas progresses from the inlet passage to the outlet passage, the gas is successively in intimate heat transfer relation with the powders carried by the meshes 43A, 43B and 43C, and the gas acquires heat from the heated particles of each bed. Thus the gas becomes increasingly hotter as it progresses toward the outlet passage.

The particles of silicon in a powder bed are of 1–60 micron average size, and the silicon is annealed after powdering as previously described. The silicon is substantially pure, and is carried on the upper surfaces of a mesh in a loose layer that is typically 0.01 to 0.1 cm. thick. A generally square aperture of a mesh has a side dimension that is smaller than the average particle size, to prevent a powder from falling through its associated mesh. When a coolant gas passes through a powder bed at a velocity of approximately 5 cm/sec, a pressure drop develops across each bed, the drop being typically 0.2 cm $H_2O$. The pressure drop assists in holding a loose powder layer on the upper surfaces of its respective mesh. The mesh portions 44D and 44E do not carry associated powder layers; rather such portions mechanically connect the portions 44A, 44B and 44C to impart structural integrity to the mesh assembly. A compliant gasket 45, in this case rubber, forms a weather proof seal to prevent moisture and other contaminants from entering the collector 40. The compliant gasket 45 permits the window 41 to move laterally toward or away from the support 42 without breakage of the weather proof seal, such lateral motion being caused by a difference between the temperature coefficients of expansion of the window 42 and the support 42.

When the solar collector 40 is used in the power plant 10 (see FIG. 2), the inlet is connected to the manifold 24, and the outlet is connected to the manifold 17. As previously described, the substantially pure, annealed silicon powder collects solar energy at high efficiency while operating at a high temperature that permits efficient conversion of the collected energy to electrical energy, especially when heat exchange and rotational apparatus is used in such conversion. The improved collection efficiency of the collector 40 correspondingly reduces the number of collectors that is required in the power plant 10.

Figure 7:
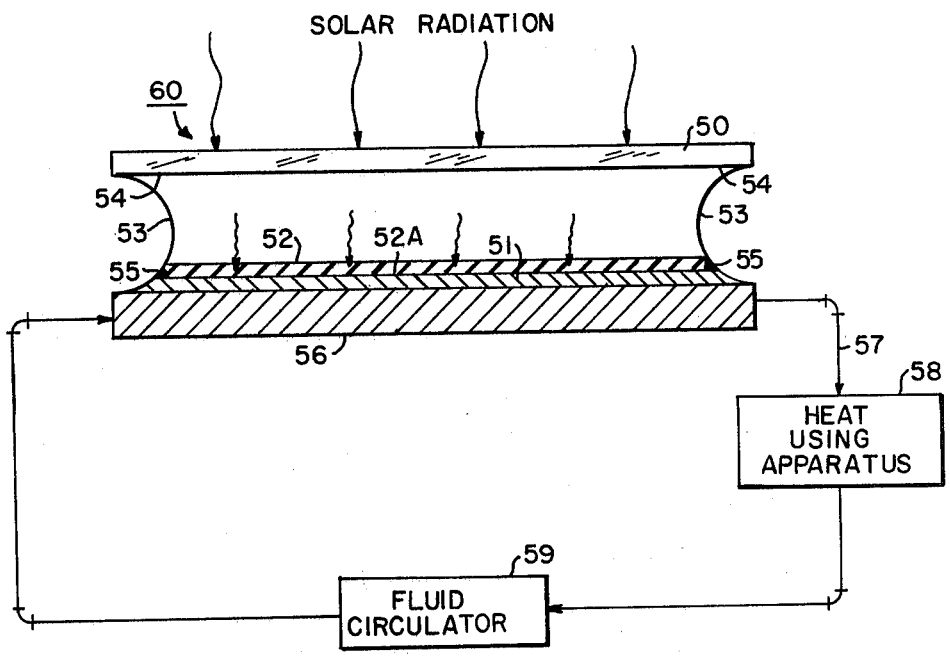
FIG. 7 shows a thermal collector of solar energy according to the present invention and employable in the power plant shown in FIG. 1.

With reference now to FIG. 7 there is shown a sectional view of a thermal collector of the energy of solar radiation 60, that employs silicon powder as an energy absorber in the form of a sintered stratum. A glass cover plate 50 transmits incident solar radiation to a steel backing 51. On the upper surface of the steel backing 51 a sintered stratum of annealed high purity silicon powder 52 is disposed so that solar radiation is transmitted through the glass cover plate 50 and is incident upon the sintered stratum 52. The sintered stratum 52 is approximately 1.0 millimeter thick. Annealed high purity silicon powder is pressed to form the stratum, and subsequently is heated to 1000° C in a nitrogen atmosphere for one hour. The sintered stratum 52 is held to the steel backing 51 by a thermally conductive brazing material 52A such as aluminum, and the two are thus in thermal communication with one another. A thin sheet of brazing material 52A is placed between the backing 51 and the stratum 52, and the assembly is heated until the brazing material melts. When the brazing material 52A solidifies the stratum 52 is held to the backing 51 by the thermally conductive brazing material 52A.

A rim 53 is formed from a thin steel band and is joined with the glass cover plate 50 along one of its edges, and with the steel backing 51 along its other edge. Thus the rim 53 connects the cover plate 50 to the backing 51. The rim 53 is joined with the glass cover plate 50 by applying a paint solution of frit glass 54 to the area of contact between the rim and the cover plate, thereafter heating the rim and the cover plate to melt the frit glass, whereupon the frit glass is permitted to solidify. The rim 53 and the steel backing 51 are joined by a conventional brazing 55. The reduced thickness of the rim 53 desirably reduces heat loss from the backing 52 through the rim 53 to the cover plate 50. The rim 53 is mechanically compliant, whereby the rim deflects to permit a lateral displacement of the cover plate 50 relative to the backing 51, due to a difference between the temperature coefficient of expansion of the cover plate and the backing.

A fluid duct 56 is disposed beneath the backing 51 to pass a heat transfer fluid along the lower surface of the backing. As it passes along the backing 51 the heat transfer fluid acquires heat from the backing. Heated fluid passes through a fluid conductor 57 to a heat using apparatus 58, such as a heating system for a building structure, an air conditioning system, a heat pump, or the like. The apparatus 58 removes heat from the heat transfer fluid, and the fluid circulator 59 thereafter passes the heat transfer fluid from the apparatus 58 to the solar collector 60. When the solar collector 60 is used in the power plant 10 (see FIG. 1) the fluid duct 56 shown in FIG. 6 is connected between the manifolds 24 and 17 of the power plant 10, to pass coolant air.

In operation, the glass cover plate 50 transmits solar radiation to the stratum 52, which absorbs a substantial portion of the energy of the transmitted radiation and is heated by such absorbed energy. Heat flows through the stratum 52 and the brazing 52A to the backing 51, and through the backing 51 to the heat transfer fluid moving through the fluid duct 56. Because the stratum 52 is composed of a high purity, annealed semiconductor and preferably silicon, the stratum 52 reradiates absorbed energy in the infrared at a reduced rate; therefore, solar energy is collected with improved efficiency which the stratum 52 and the backing 51 operate at an elevated temperature, whereby the heat transfer fluid is delivered to the heat using apparatus 58 at a correspondingly elevated temperature, for improved efficiency of utilization of heat by the apparatus 58.

Alternately the sintered stratum 52 may be replaced by a paint solution of a high purity, annealed semiconductor powder, preferably silicon, that is applied directly to the surface of the backing 51. A vehicle, also referred to as a binder, for such a paint is desirably transparent up to wavelengths of approximately 20 microns, so that the vehicle does not reradiate in the infrared, absorbed energy that is acquired from the silicon particles. Additionally a desirable vehicle for such a paint efficiently conducts heat from the silicon particles to the backing 51 and is capable of withstanding the elevated operating temperature of the collector 60.

Figure 8:
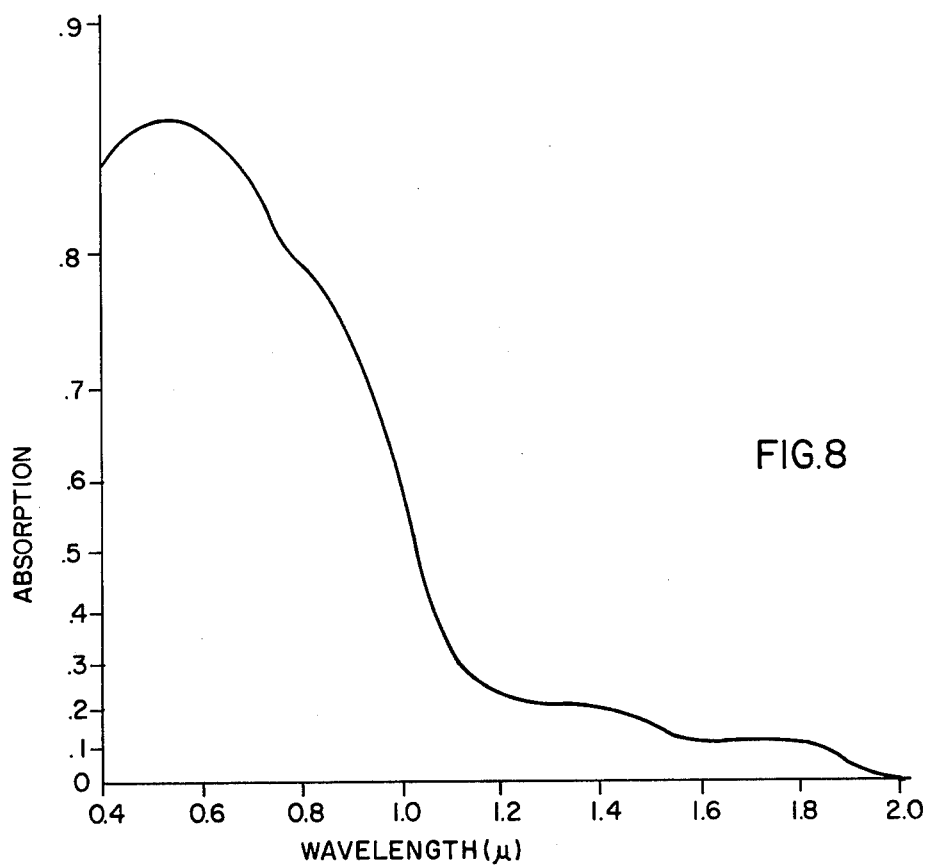
FIG. 8 graphically illustrates the fractional absorption characteristics of a paint solution of substantially pure, annealed silicon powder.

Organic coatings typically are stronger infrared radiators than is desirable for such a vehicle, due largely to the presence of hydrogen as a component of the organic coatings. However, silicone varnishes as a class typically have a reduced hydrogen content and therefore a diminished tendency to radiate in the infrared. FIG. 8 shows the fractional absorption characteristic of a paint that comprises one part of annealed high purity silicon powder in a commercially available silicone varnish (specification DC-991, available from Dow Corning Corporation). At shorter wavelengths, the fractional absorption of the paint is higher than the fraction absorption of the dry silicon powder (see FIG. 3). At wavelengths greater than approximately 1.0 micron, the fractional absorption of the paint (FIG. 8) is greater than that of the dry silicon powder at corresponding wavelengths (FIG. 3), causing a somewhat increased tendency for the paint to reradiate energy in the infrared. Silicone varnishes as a class also have a high fractional absorption at approximately 9.0 microns, due to a Si-O vibrational resonance at that wavelength that is not shown in FIG. 8. Therefore the silicon varnishes are efficient radiators at the wavelength of vibrational resonance.

Thermal collectors of solar energy are useable with heat using apparatus such as home heating and air conditioning systems, heat pumps, and the like. Such applications are disclosed in Ser. No. 544,605 assigned to the present assignee, entitled "Thermal Collector of Solar Energy Adapted For High Temperature Operation" and filed by R. W. Warren.

Although the present invention is disclosed in specific embodiments thereof, it is understood that various modifications, changes, and substitutions may be made without departing from the spirit and scope of the invention.

I claim:

1. A thermal collector of solar energy that is adapted to delivery collected energy to a heat using apparatus, comprising,
   first means for transmitting solar radiation,
   second means for supporting a finely divided semiconductor material in relation to said first means to expose the semiconductor material to the transmitted radiation, whereby the semiconductor material absorbs at least a portion of the energy of the transmitted radiation and is heated by the absorbed energy, and
   third means for transferring heat from the semiconductor material to the heat using apparatus.

2. A thermal collector according to claim 1 wherein said second means includes a mesh having opening sufficiently small to carry the finely divided semiconductor material, said mesh being oriented to expose the semiconductor material to the transmitted radiation, and said third means includes,
   means for passing a coolant gas through said mesh in heat transfer relation with the semiconductor material, whereby the coolant gas acquires heat from the semiconductor material.

3. A thermal collector according to claim 1 wherein said second means includes,
   a thermally conductive binder to hold the finely divided semiconductor material dispersed therethrough, and
   a thermally conductive backing bearing said binder on at least one of its surfaces, said backing being oriented to expose said binder to the transmitted radiation, whereby heat of absorbed energy flows through said binder and through said backing, and said third means includes,
   means for transferring heat from said backing to the heat using apparatus.

4. A thermal collector according to claim 3 wherein said binder is substantially transparent to radiation of wavelength less than 20 microns.

5. A thermal collector according to claim 1 wherein said second means includes,
   a sintered stratum of the finely divided semiconductor material,
   a thermally conductive backing, and
   means for holding said stratum to at least one surface of said backing, said backing being oriented to expose said stratum to the transmitted radiation, and said holding means being thermally conductive and in thermal communication with said stratum and said backing, whereby heat flows from said stratum through said holding means and said backing, and said third means includes,
   means for transferring heat from said backing to the heat using apparatus.

6. A thermal collector according to claim 1 wherein the semiconductor material is an elemental semiconductor material.

7. A thermal collector according to claim 6 wherein the semiconductor material is annealed, high purity silicon.

8. A thermal collector of solar energy, comprising,
   a support,
   a window to transmit solar radiation, said window being carried by said support,
   a finely divided elemental semiconductor material to receive solar radiation and to absorb a substantial portion of the energy of the received radiation, said semiconductor material being heated by such absorbed energy, and
   means for disposing said semiconductor material on said support to receive radiation that is transmitted by said window, and for transferring heat from the material to said support.

9. A thermal collector according to claim 8 wherein said means includes a thermally conductive binder, and the semiconductor material particles are disposed through the binder in a paint solution that is applied to said support.

10. A thermal collector according to claim 8 wherein said semiconductor material is formed into a sintered stratum, and said means includes a thermally conductive brazing material to hold the sintered stratum to said support.

11. A gas-cooled thermal collector of solar energy, comprising,
   a window to transmit solar radiation,
   a support to carry said window,
   a finely divided elemental semiconductor material to receive solar radiation and to absorb a substantial portion of the energy of the received radiation, said semiconductor material being heated by the absorbed energy,
   means carried by said support for exposing said semiconductor material to solar radiation that is transmitted by said window, and
   means for passing a flow of coolant gas in heat transfer relation with the semiconductor material particles, whereby the coolant gas acquires heat from the particles.

12. A thermal collector according to claim 11 wherein said semiconductor material is high purity, annealed silicon.

13. A solar electric power plant, comprising,
   a bed including a finely divided energy absorbing material to absorb at least a portion of the energy of solar radiation that is incident upon the material, said bed being pervious to a flow of coolant gas,
   first means for supporting said bed and for transmitted solar radiation to the material of said bed,
   second means connected to said first means for passing a flow of coolant gas in heat transfer relation with the material of said bed, whereby the gas is heated by the absorbed energy of solar radiation, third means connected to said second means for deriving heat from the heated gas and generating stream from the derived heat, a rotatable electric generator, and a steam turbine connected to pass steam that is generated by said third means and rotatably coupled to drive said electric generator.

14. A power plant according to claim 13 wherein, and said bed includes a mesh to carry the finely divided material.

15. A power plant according to claim 13 wherein the energy-absorbing material is a finely divided semiconductor.

16. A power plant according to claim 13 wherein the energy-absorbing material is a finely divided elemental semiconductor.

17. A power plant according to claim 16 wherein the semiconductor material is substantially pure.

18. A power plant according to claim 16 wherein the finely divided semiconductor material is annealed.

19. A power plant according to claim 13 wherein said first means includes a glass window to transmit solar radiation to said bed.

20. A power plant according to claim 1 further comprising an insulating material applied to said first means to reduce a leakage heat flow from said first means to its environment.

21. A solar electric power plant, comprising, a body of finely divided elemental semiconductor material to receive solar radiation and absorb at least a portion of the energy of the received radiation, whereby the semiconductor material is heated by the absorbed energy, a window to transmit solar radiation to said semiconductor body, first means for supporting said window and for supporting said semiconductor body in relation to said window to expose said semiconductor body to the transmitted radiation, second means for transferring heat from said semiconductor body to a motive fluid, a turbine driven by the motive fluid, and a rotatable electric generator driven by said turbine.

22. A power plant according to claim 21 wherein said second means includes, means for passing a flow of heat transfer fluid in heat transfer relation with said semiconductor body, whereby the heat transfer fluid acquires heat from the semiconductor material, and means for transferring heat from the heated heat transfer fluid to the motive fluid.

23. A power plant according to claim 22 further comprising, means for governing the flow of motive fluid from said heat transfer means to said turbine, and means for governing the flow of heat transfer fluid, 24. A power plant according to claim 22 wherein said first means includes a mesh having opening sufficiently small to carry said semiconductor body, and the heat transfer fluid is a coolant gas that passes through the mesh in thermal communication with the particles of the semiconductor material.

25. A power plant according to claim 24 where said mesh is disposed generally horizontally and carries said semiconductor body on its upper surfaces, and the coolant gas passes downwardly through said semiconductor body and said mesh.

26. A power plant according to claim 24 wherein said mesh is arranged to intersect the flow of coolant gas at least twice, the coolant gas being heated upon each passage through said mesh and said semiconductor material.

27. A power plant according to claim 21 wherein the semiconductor material is substantially pure silicon that is annealed after it is finely divided.

* * * * *